United States Patent
Allen (10) Patent No.: US 8,418,954 B2
(45) Date of Patent: Apr. 16, 2013

(54) SPOILER DEPLOYMENT MECHANISM

(75) Inventor: Damian Allen, Bristol (GB)

(73) Assignee: Airbus Operations Limited, Bristol (GB)

( * ) Notice: Subject to any disclaimer, the term of this patent is extended or adjusted under 35 U.S.C. 154(b) by 237 days.

(21) Appl. No.: 12/936,750

(22) PCT Filed: Apr. 28, 2009

(86) PCT No.: PCT/GB2009/050432
§ 371 (c)(1),
(2), (4) Date: Oct. 7, 2010

(87) PCT Pub. No.: WO2009/136187
PCT Pub. Date: Nov. 22, 2009

(65) Prior Publication Data
US 2011/0031347 A1 Feb. 10, 2011

(30) Foreign Application Priority Data
May 9, 2008 (GB) .................................. 0808349.5

(51) Int. Cl.
*B64C 25/50* (2006.01)
(52) U.S. Cl.
USPC .............................. 244/99.3; 244/213; 74/105
(58) Field of Classification Search .................. 244/99.3, 244/213; 74/105
See application file for complete search history.

(56) References Cited

U.S. PATENT DOCUMENTS

| | | | |
|---|---|---|---|
| 2,041,688 A | 5/1936 | Barnhart | |
| RE20,075 E | 8/1936 | Barnhart | |
| 2,973,925 A | 3/1961 | Wiele | |
| 3,908,842 A * | 9/1975 | Place | ............................ 414/563 |
| 4,019,781 A * | 4/1977 | Ray | .............................. 298/22 J |
| 4,100,850 A * | 7/1978 | Wolbrink et al. | ............. 100/287 |
| 4,564,160 A * | 1/1986 | Vermilye | .................. 244/110 B |

(Continued)

FOREIGN PATENT DOCUMENTS

| | | |
|---|---|---|
| DE | 705499 | 4/1941 |
| DE | 737445 | 7/1943 |

(Continued)

OTHER PUBLICATIONS

UK Search Report for Application No. GB0808349.5 mailed Sep. 2, 2008.

(Continued)

*Primary Examiner* — Isam Alsomiri
*Assistant Examiner* — Assres H Woldemaryam
(74) *Attorney, Agent, or Firm* — Lowe Hauptman Ham & Berner, LLP (57) ABSTRACT

An aircraft wing assembly comprising: a wing; a spoiler pivotally attached to the wing; and a spoiler deployment mechanism. The deployment mechanism comprises a scissor linkage mechanism comprising an upper link pivotally attached to the spoiler at an upper pivot, and a lower link pivotally attached to the wing at a lower pivot and to the upper link at a central pivot. An actuator is pivotally attached to the wing at a proximal pivot and to the scissor linkage mechanism at a distal pivot. The actuator is adjustable between expanded and contracted configurations so as to vary the distance between the proximal and distal pivots. This opens up the angle between the upper and lower links of the scissor linkage mechanism and pushes the spoiler up into the air-stream above the wing.

12 Claims, 6 Drawing Sheets

U.S. PATENT DOCUMENTS

| | | | |
|---|---|---|---|
| 4,834,326 A | | 5/1989 | Stache |
| 4,930,598 A | * | 6/1990 | Murrill et al. ............... 182/69.5 |
| 5,035,471 A | * | 7/1991 | Ackerman .................. 312/291 |
| 5,092,542 A | * | 3/1992 | Ellis et al. ................. 244/137.4 |
| 5,207,400 A | * | 5/1993 | Jennings ..................... 244/216 |
| 5,308,357 A | * | 5/1994 | Lichtman ..................... 606/205 |
| 5,487,216 A | * | 1/1996 | Demarest et al. .............. 29/705 |
| 5,613,636 A | * | 3/1997 | Zubillaga et al. ......... 239/265.35 |
| 5,810,877 A | * | 9/1998 | Roth et al. ................... 606/205 |
| 6,010,097 A | * | 1/2000 | Cox ............................. 244/216 |
| 6,097,978 A | * | 8/2000 | Demarais et al. ............. 600/429 |
| 6,224,146 B1 | * | 5/2001 | Willard et al. ........... 296/216.03 |
| 6,530,544 B2 | * | 3/2003 | Milliere ........................ 244/213 |
| 6,808,194 B2 | * | 10/2004 | Martin .......................... 280/402 |
| 7,063,292 B2 | * | 6/2006 | Perez-Sanchez ............. 244/216 |
| 7,578,543 B2 | * | 8/2009 | Wegener et al. ........... 296/180.5 |
| 7,841,829 B2 | * | 11/2010 | Schmaling et al. ............... 416/1 |
| 8,104,710 B2 | * | 1/2012 | Harvey et al. ................ 244/99.2 |
| 2005/0165429 A1 | * | 7/2005 | Douglas et al. ............... 606/157 |
| 2006/0017032 A1 | * | 1/2006 | DeWall et al. ........... 251/129.11 |
| 2008/0265089 A1 | * | 10/2008 | Zeumer ....................... 244/99.3 |
| 2009/0001224 A1 | | 1/2009 | Perez-Sanchez |
| 2009/0134281 A1 | * | 5/2009 | Engelbrecht et al. ......... 244/215 |
| 2009/0200420 A1 | * | 8/2009 | Harvey et al. ................ 244/99.3 |
| 2010/0116928 A1 | * | 5/2010 | Cerne ............................. 244/87 |
| 2012/0126056 A1 | * | 5/2012 | Curry et al. ................ 244/118.1 |

FOREIGN PATENT DOCUMENTS

| | | |
|---|---|---|
| DE | 3702294 | 4/1988 |
| EP | 1764303 | 3/2007 |
| FR | 877353 | 12/1942 |
| GB | 517422 | 1/1940 |
| GB | 585564 | 2/1947 |
| GB | 870689 | 6/1961 |

OTHER PUBLICATIONS

International Search Report for Application No. PCT/GB2009/050432 mailed Oct. 15, 2009.

* cited by examiner

SPOILER DEPLOYMENT MECHANISM

RELATED APPLICATIONS

The present application is a national phase of PCT/GB2009/050432, filed Apr. 28, 2009, and claims priority from, Great Britain Application Number 0808349.5, filed May 9, 2008.

FIELD OF THE INVENTION

The present invention relates to an aircraft wing assembly comprising: a wing; a spoiler pivotally attached to the wing; and a spoiler deployment mechanism.

BACKGROUND OF THE INVENTION

Conventional spoiler deployment mechanisms comprise a linear actuator pivotally attached to the wing at a proximal pivot and to the spoiler at a distal pivot. The actuator is co-oriented in a girth-wise (wing depth) direction. In future aircraft, the girth-wise space available behind the rear spar is becoming increasingly small, making such conventional mechanisms unsuitable.

DE737445 describes an aircraft wing with a number of air brakes which extend partially along the span of the wing. A linkage mechanism can be operated to move the air brakes vertically between retracted and deployed positions. In their retracted positions, the air brakes are housed in slots formed inside the wing. In their deployed positions, some of the air brakes extend vertically from the upper surface of the wing while others extend vertically from the lower surface of the wing.

DE705499 describes an aircraft wing with an air brake pivotally mounted to the wing. A linkage mechanism is provided for controlling motion of the air brake between retracted and deployed positions.

USRE20075 describes an airfoil with a shiftable lower surface pivoted at its forward edge to a rigid upper section of the airfoil. The shiftable lower surface may be shifted relative to the rigid upper section by toggle joint members which are pivotally connected together, to the rigid upper section and to the shiftable lower surface. The toggle joint members are controlled by a crank member which is mounted on the rigid upper section and extends into the fuselage.

FR877353 describes an air brake which is pivotally attached to a wing. The air brake is deployed by a chord-wise oriented deployment mechanism comprising an actuator and a linkage mechanism. When the actuator is extended, the air brake is retracted and when the actuator is contracted, the air brake is deployed.

SUMMARY OF THE INVENTION

A first aspect of the invention provides an aircraft wing assembly comprising: a wing; a spoiler pivotally attached to the wing; and a spoiler deployment mechanism comprising: a linkage mechanism with an upper link pivotally attached to the spoiler at an upper pivot, and a lower link pivotally attached to the wing at a lower pivot and to the upper link at a central pivot; and an actuator pivotally attached to the wing at a proximal pivot and to the linkage mechanism at a distal pivot, the actuator being adjustable between expanded and contracted configurations so as to vary the distance between the proximal and distal pivots, wherein the proximal and distal pivots are spaced apart in a predominantly span-wise direction in at least one configuration of the actuator.

A further aspect of the invention provides a method of operating the assembly of the first aspect of the invention, the method comprising: adjusting the actuator from its contracted configuration to its expanded configuration; opening up the angle between the upper and lower links of the linkage mechanism; and pushing the spoiler up into the air-stream above the wing with the upper link of the linkage mechanism.

The use of a linkage mechanism in combination with a pivoting actuator enables the deployment mechanism to take up less space in a girth-wise direction since the stroke of the actuator can act in a predominantly span-wise direction. It also enables a larger and more powerful actuator to be used if necessary.

The actuator may be attached to the upper link or the lower link at a distal pivot which is spaced apart from the central pivot. This can provide an element of mechanical advantage. For instance the distal pivot may attach the actuator to the upper link, and the central pivot is located between the distal pivot and the upper pivot. Alternatively the distal pivot which attaches the actuator to the linkage mechanism may be co-axial with the central pivot which attaches the lower link of the linkage mechanism to the upper link of the linkage mechanism. This makes for a more compact arrangement.

In the co-axial case then the central and distal pivots may be provided by a pivot pin which passes through the actuator and the two links.

The pivotal attachment between the spoiler and the wing may allow a complex movement, but more preferably the spoiler is pivotally attached to the wing at a spoiler pivot which remains fixed as the spoiler is deployed. Similarly, the lower pivot may translate during deployment but more preferably the lower pivot remains fixed as the spoiler is deployed.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
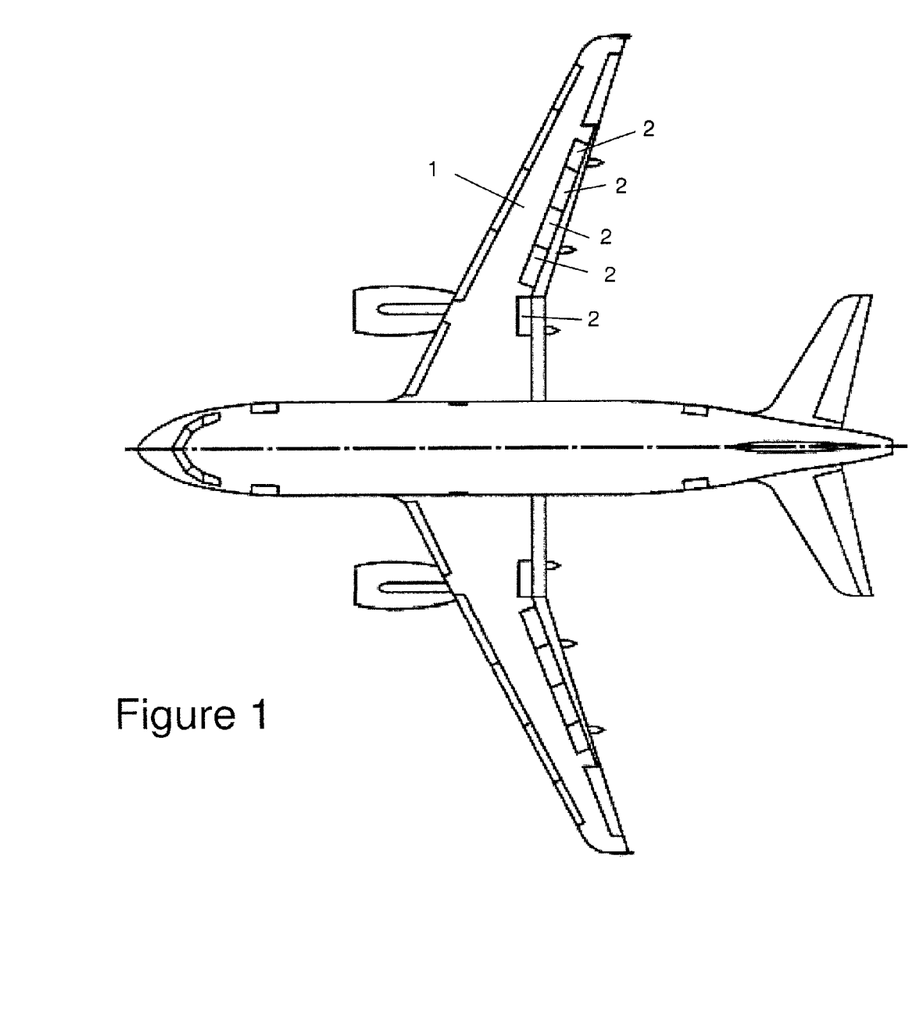
FIG. 1 is a plan view of an aircraft.

An aircraft shown in FIG. 1 comprises a wing 1 with a series of spoilers 2 (otherwise known as air brakes or lift dumpers) on its upper surface. One of these spoilers 2 is shown in FIGS. 2-5. The wing comprises a rear spar 3 to which the spoiler 2 is pivotally attached by a pair of hinges 4. The spoiler pivot line 5 provided by these hinges 4 remains fixed as the spoiler is deployed.

The spoiler 2 is rotated about the pivot line 5 by a spoiler deployment mechanism 6 comprising a scissor linkage mechanism 7 and a linear actuator 8. The scissor linkage mechanism 7 comprises an upper link 9 pivotally attached to the spoiler at an upper pivot 10, and a lower link 11 pivotally attached to the spar 3 at a lower pivot 12 and to the upper link 9 at a central pivot 13.

Figure 6:
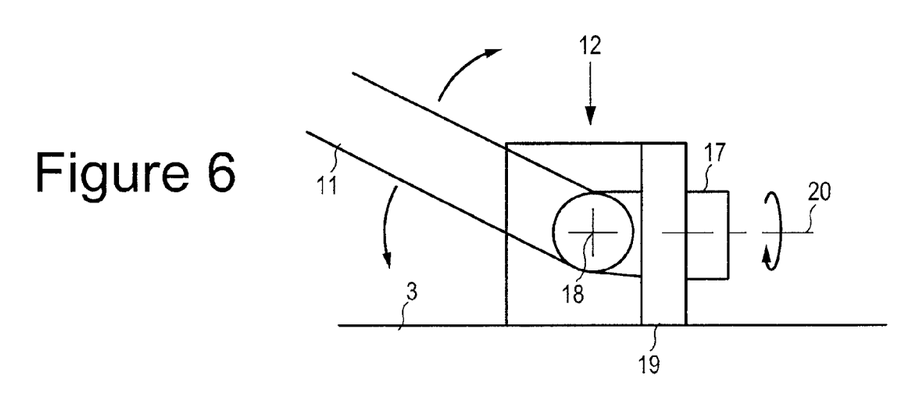
FIG. 6 is a rear view of the lower hinge.
Figure 7:
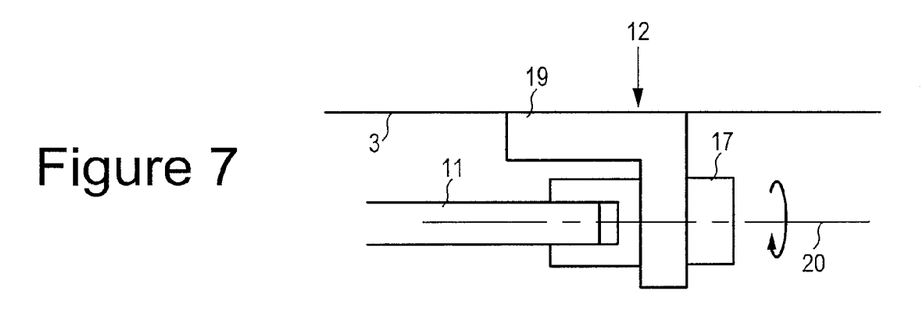
FIG. 7 is a plan view of the lower hinge.

The lower hinge mechanism at the lower pivot 12 is shown in detail in FIGS. 6 and 7. The lower link 11 is pivotally attached to a hinge member 17 via a clevis joint which permits the link to pivot about an axis 18 as shown in FIG. 6. The hinge member 17 is rotatably mounted to a bracket 19 fixed to the spar 3, so that the link 11 can also rotate about an axis 20. Thus the lower link 11 can rotate at the lower pivot 12 with four degrees of freedom.

The upper hinge mechanism at the upper pivot 10 is similar to the lower hinge mechanism so that the upper link 9 can rotate about the upper pivot 10 with four degrees of freedom.

The actuator 8 comprises a hydraulic cylinder 21 pivotally attached to a rib or other fitting (not shown) extending from the spar 3 at a proximal pivot 14, and a piston rod 15 pivotally attached to the scissor linkage mechanism at the central pivot 13. The cylinder 21 can be pressurised to drive the piston rod 15 out in straight line.

Figure 8:
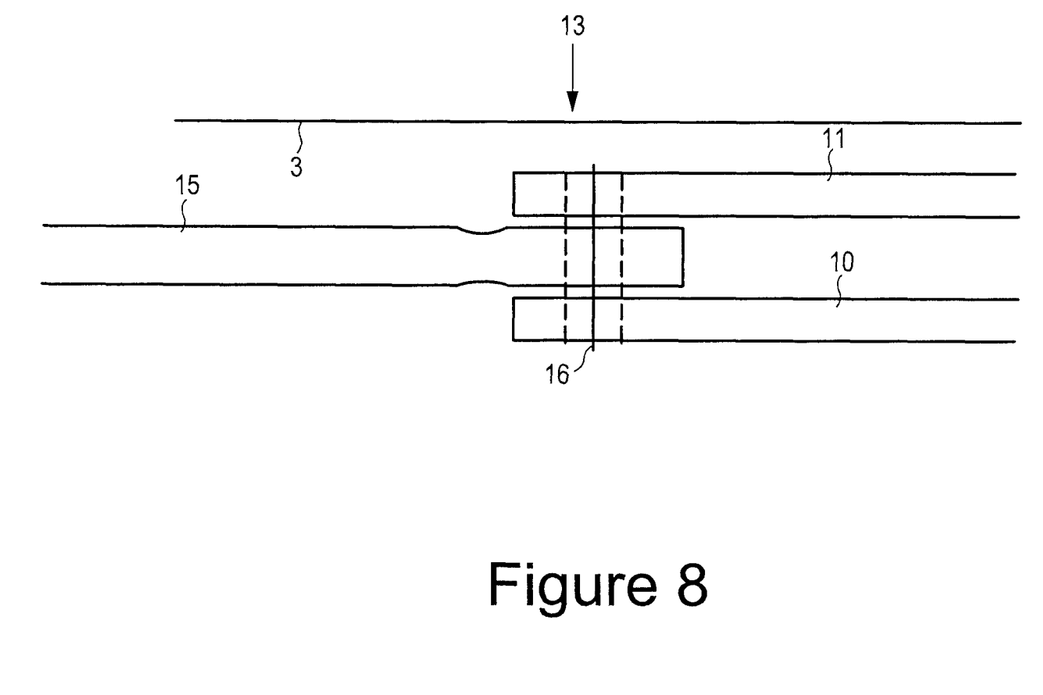
FIG. 8 is a plan view of the central hinge.

The structure of the hinge mechanism at the central pivot 13 is shown in detail in FIG. 8. The piston rod 15 has a hole at its distal end. A pivot pin 16 passes through the hole in the rod 15 and also through axially aligned holes in the upper link 9 and the lower link, 11. Thus the hinge mechanism shown in FIG. 8 provides both a distal pivot between the actuator and the scissor linkage mechanism, and a central pivot between the scissor arms.

Figure 2:
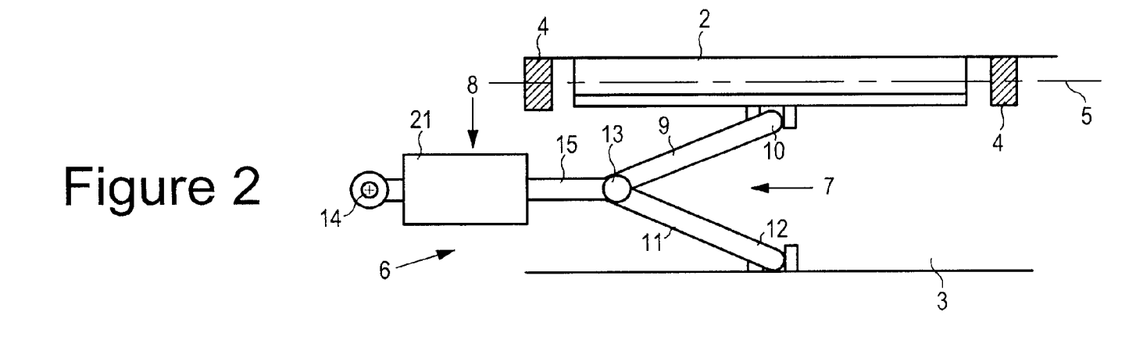
FIG. 2 is a rear view of a spoiler assembly according to a first embodiment of the invention in its retracted configuration.
Figure 3:
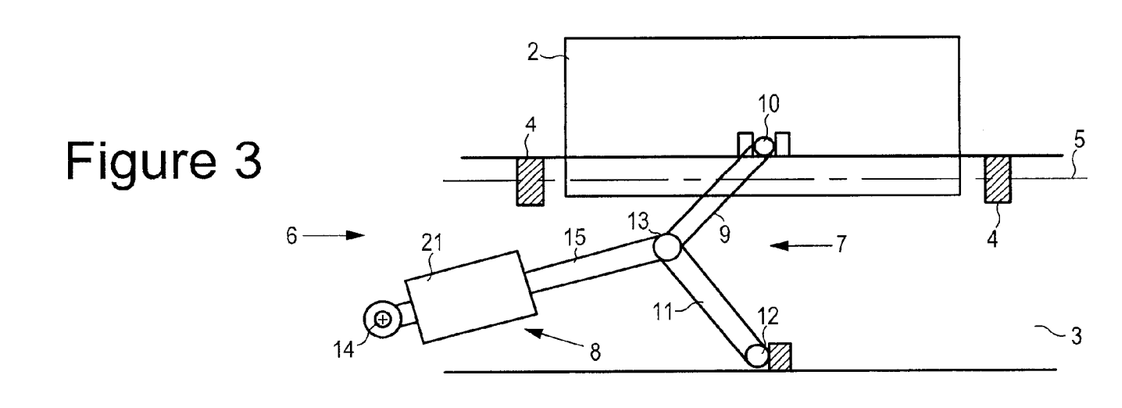
FIG. 3 is a rear view of the assembly in its deployed configuration.
Figure 4:
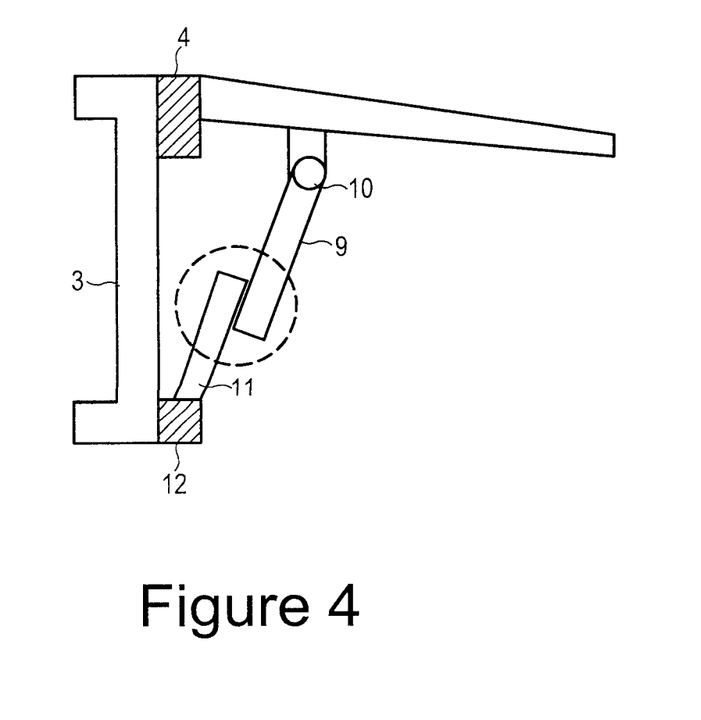
FIG. 4 is a side view of the assembly in its retracted configuration.
Figure 5:
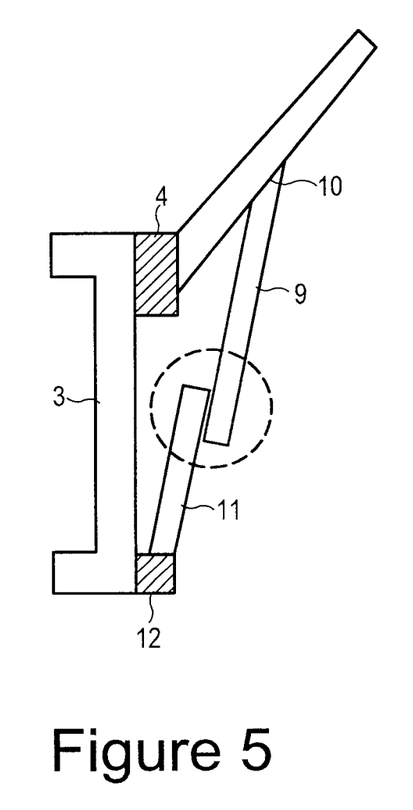
FIG. 5 is a side view of the assembly in its deployed configuration.

The spoiler is deployed by adjusting the actuator from its contracted configuration shown in FIG. 2 to its expanded configuration shown in FIG. 3, forcing the proximal and distal pivots 14,13 apart along a straight line of action. This forces the angle to open up between the upper and lower links of the scissor linkage mechanism, and the upper link 9 pushes the spoiler up into the air-stream above the wing. The actuator 8 rotates up about the pivot 14 to accommodate the motion of the central pivot 13 as the actuator 8 expands. The lower link 11 rotates about axis 18 (as shown in FIGS. 2 and 3) and about axis 20 (as shown in FIGS. 4 and 5). The upper link 9 also rotates about two orthogonal axes at the upper hinge mechanism which attaches it to the spoiler.

As can be seen in FIGS. 4 and 5, the lower pivot 12 of the scissor linkage mechanism is positioned forward of the upper pivot 10 of the scissor linkage mechanism in all positions of the spoiler.

As can be seen in FIGS. 2 and 3, the pivots 13, 14 are spaced apart in a predominantly span-wise direction in both the contracted and expanded configurations of the actuator. Thus the deployment mechanism takes up less space in a girth-wise direction. It also enables a large and powerful actuator 8 to be used if necessary.

Figure 9:
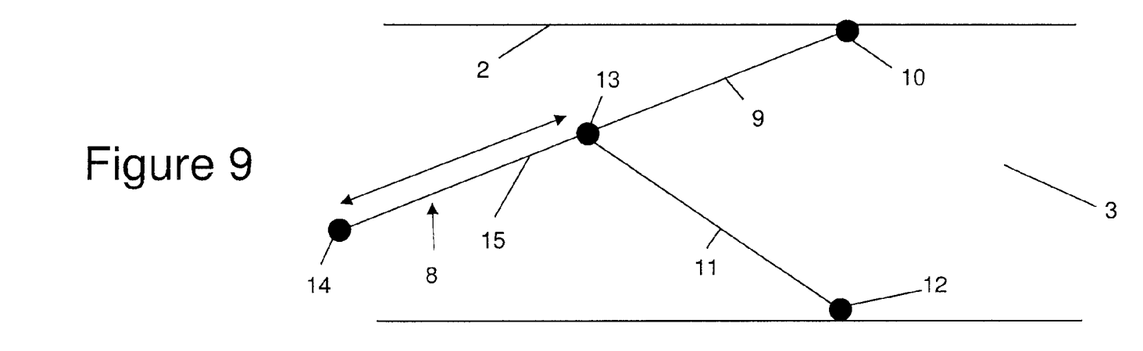
FIG. 9 is a schematic rear view of a spoiler assembly according to a second embodiment of the invention in its retracted configuration.

An alternative configuration for the spoiler deployment mechanism is shown schematically in FIG. 9. This arrangement is similar to that described in FIGS. 2-8, and the same reference numerals are used for equivalent features. In this case, in its contracted state the actuator 8 is in line with the upper link 9.

Figure 10:
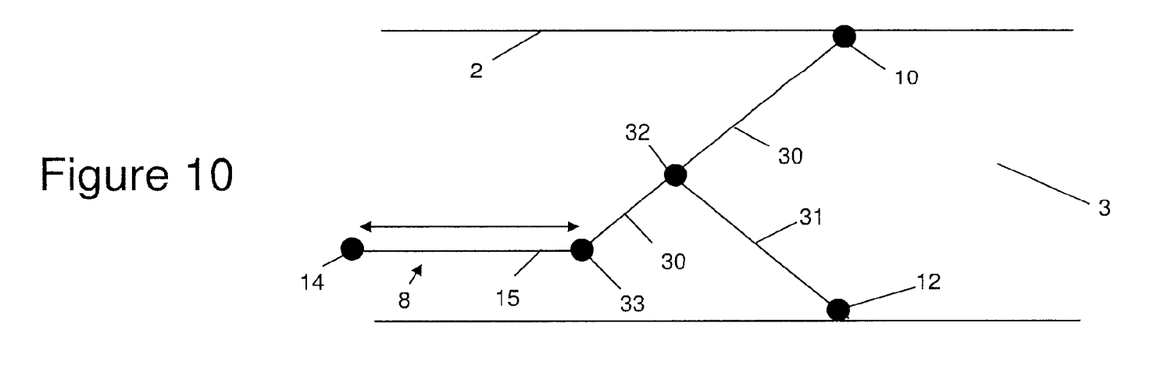
FIG. 10 is a schematic rear view of a spoiler assembly according to a third embodiment of the invention in its retracted configuration.

A second alternative configuration is shown schematically in FIG. 10. Again, this arrangement is similar to that described in FIGS. 2-9, and the same reference numerals are used for equivalent features. In this case, the upper link of the scissor linkage mechanism extends beyond the hinge which connects it to the lower link. Specifically, the scissor linkage mechanism comprises an upper link 30 which is pivotally attached at its upper end to the spoiler 2 by the upper pivot 10, and pivotally attached at its lower end to the actuator piston 15 by a distal pivot 33. The lower link 31 of the scissor linkage mechanism is pivotally attached to the spar 3 at lower pivot 12 and to the upper link 30 at a central pivot 32. In this case the central pivot 32 is not co-axial with the distal pivot 33, but rather is located on the upper link 30 between the distal pivot 33 and the upper pivot 10. This arrangement provides a greater mechanical advantage than the arrangement of FIG. 2. The benefits of the arrangement of FIG. 2 (in comparison to the arrangement of FIG. 10) are that the scissor linkage mechanism is more compact, and that the actuator is positioned in a more central position (in a girth-wise sense) so can be larger.

Although the invention has been described above with reference to one or more preferred embodiments, it will be appreciated that various changes or modifications may be made without departing from the scope of the invention as defined in the appended claims.

The invention claimed is:

1. An aircraft wing assembly comprising:
   a. a wing;
   b. a spoiler pivotally attached to the wing; and
   c. a spoiler deployment mechanism comprising:
      i. a linkage mechanism with an upper link pivotally attached to the spoiler at an upper pivot, and a lower link pivotally attached to the wing at a lower pivot and to the upper link at a central pivot; and
      ii. an actuator pivotally attached to the wing at a proximal pivot and to the linkage mechanism at a distal pivot, the actuator being adjustable between expanded and contracted configurations so as to vary the distance between the proximal and distal pivots,
   wherein the proximal and distal pivots are spaced apart in a predominantly span-wise direction in at least one configuration of the actuator, wherein the upper link can rotate about two orthogonal axes and the lower link can rotate about two orthogonal axes, and wherein the distal pivot which attaches the actuator to the linkage mechanism is co-axial with the central pivot which attaches the lower link of the linkage mechanism to the upper link of the linkage mechanism.

2. The assembly of claim 1 further comprising a pivot pin which passes through the actuator and the upper and lower links.

3. The assembly of claim 1 wherein the distal pivot attaches the actuator to the upper link, and wherein the central pivot is located between the distal pivot and the upper pivot.

4. The assembly of claim 1 wherein the spoiler is pivotally attached to the wing at a spoiler pivot which remains fixed as the spoiler is deployed.

5. The assembly of claim 1 wherein the lower pivot remains fixed as the spoiler is deployed.

6. The assembly of claim 1 wherein the wing comprises a rear spar and the spoiler is pivotally attached to the rear spar.

7. The assembly of claim 1 wherein the lower pivot of the linkage mechanism is positioned forward of the upper pivot of the linkage mechanism.

8. The assembly of claim 1 wherein the distal pivot moves up as the actuator expands.

9. The assembly of claim 1 wherein the lower link can rotate about the lower pivot with at least four degrees of freedom.

10. The assembly of claim 1 wherein the upper link can rotate about the upper pivot with at least four degrees of freedom.

11. A method of operating the assembly of claim 1, the method comprising:
   a. adjusting the actuator from its contracted configuration to its expanded configuration;
   b. opening up the angle between the upper and lower links of the linkage mechanism; and
   c. pushing the spoiler up into the air-stream above the wing with the upper link of the linkage mechanism.

12. The method of claim 11 further comprising rotating the upper link about two orthogonal axes and rotating the lower link about two orthogonal axes.

* * * * *